Jan. 18, 1966    R. R. SPANGLER ET AL    3,230,007
BOOTH SEAT
Filed March 8, 1965    2 Sheets-Sheet 1

INVENTORS
RAY R. SPANGLER, AND
CLYDE E. STANFIELD
BY
Fishburn and Gold
ATTORNEYS

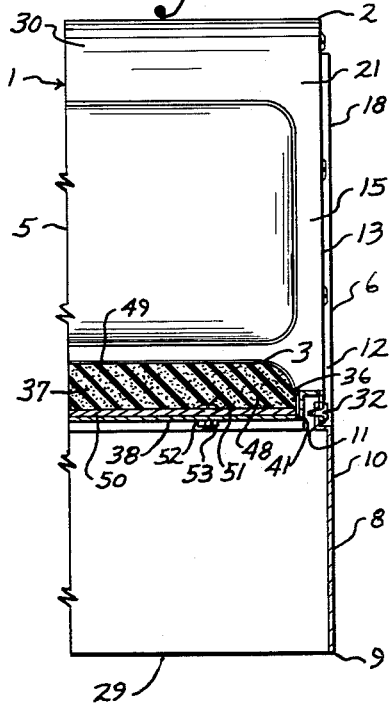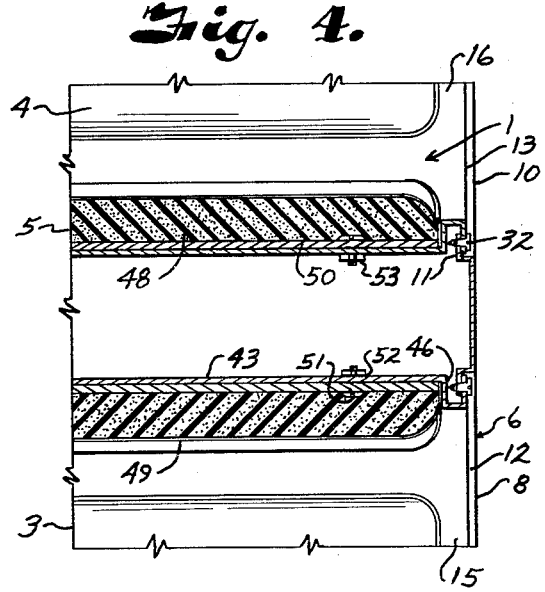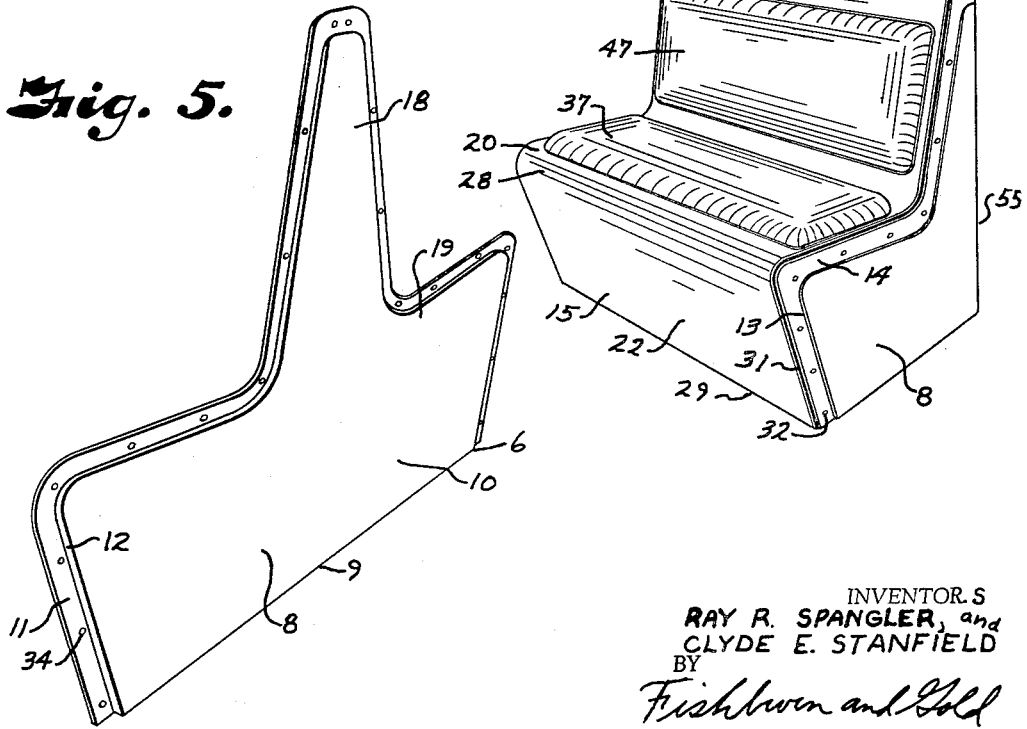

United States Patent Office 3,230,007
Patented Jan. 18, 1966

3,230,007
BOOTH SEAT
Ray R. Spangler and Clyde E. Stanfield, both c/o Auto Fabric & Glass Co., 11445 Truman Road, Independence, Mo.
Filed Mar. 8, 1965, Ser. No. 437,756
7 Claims. (Cl. 297—244)

This invention relates to improvements in seats or chair structures, and more particularly to booth seats for restaurants and the like.

Booths are commonly constructed in restaurants, cafes and like places for serving food and refreshments to form semi-private areas and to conserve space. In such booths the seats are arranged whereby spaced seats extend outwardly from an adjacent wall and have a table therebetween and usually such structures are heavy and require considerable construction at the site in the installation thereof and, in the event of damage or wear as to the upholstering, extensive removal and reconstruction is frequently necessary.

The principal objects of the present invention are to provide booth seat structures adapted for manufacture in production methods wherein the parts are few and interchangeable; to provide a booth seat structure that can be shipped knocked down in sections and quickly and easily assembled on the location where they are to be used; to provide such a structure having end sections and sections forming the seat and back portions that are connected together at the ends to form a rigid, self-supporting assembly; to provide such a structure with flanges on the sections that overlap and are connected in assembling the seats; to provide such a structure wherein the section having the seat and back portions is formed by a wall with a cushion-receiving recess in each of the seat and back portions; to provide such a booth seat structure with rounded corners and edges on portions normally contacted by persons using said seats; to provide such a structure that is particularly adapted for the sections to be molded of fiber-reinforced plastic to form a strong, lightweight construction; and to provide a booth seat structure that is economical to manufacture, ship and assemble into a solid, substantial, durable structure that is attractive in appearance.

Other objects and advantages of this invention will become apparent from the following description taken in connection with the accompanying drawings wherein are set forth by way of illustration and example certain embodiments of this invention.

FIG. 3 is a vertical sectional view through the booth seat taken on the line 3—3, FIG. 2.

FIG. 4 is a horizontal sectional view through the booth seat structure taken on the line 4—4, FIG. 2.

FIG. 5 is a perspective view of one of the end sections of the booth seat structure.

FIG. 6 is a perspective view of a booth seat structure having only one seat portion.

Figure 1:
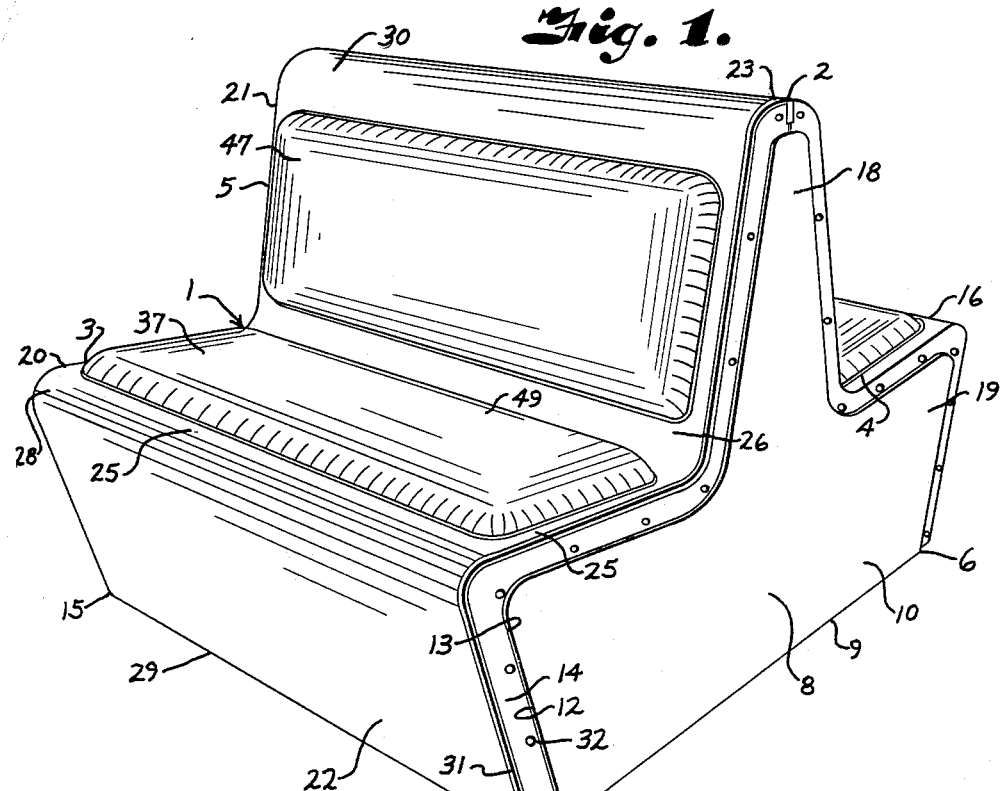
FIG. 1 is a perspective view of a booth seat structure embodying the invention.

Referring more in detail to the drawings:

The reference numeral 1 generally designates a booth type seat having an upstanding back portion 2 with cushioned seat portions 3 and 4 extending oppositely from the lower end thereof. The seat structure illustrated in FIGS. 1 to 5 inclusive with the seat portions 3 and 4 extending from the back member 2 forms a structure wherein the back member has opposed cushioned back portions 5 one for each of the seat portions so that they are in back-to-back arrangement. It is preferred that the seat structure be made of sections whereby it can be shipped knocked down and assembled at location of use. It is also preferred that the opposed portions of the structure be substantially identical in structure and appearance whereby either end may be disposed adjacent a wall with the seat extending substantially perpendicularly outwardly therefrom.

The seat structure illustrated in FIGS. 1 to 5 inclusive has end sections 6 and 7 each having a wall portion 8 extending upwardly from a bottom edge 9 and presenting a substantially flat outer face 10. The peripheral portion of the respective end section above the bottom edge 9 has an inset flange 11 whereby at the joinder thereof with the flat wall portion 8 there is an outwardly and upwardly facing shoulder 12 substantially engaged by inner edges 13 of flanges 14 on ends of seat and back sections 15 and 16, said flanges 14 preferably overlying the flanges 11 of the respective end sections.

The structure of the end sections is illustrated in FIG. 5, and the bottom edge 9 is preferably straight and adapted to rest on a floor or other support. The other edges or shoulders 12 of the wall portion 8 and the flanges 11 thereon generally correspond in contour to respective portions of the seat and back sections 15 and 16 with the end sections having upstanding central portions 18 and oppositely extending lower portions 19 forming end closures for the seat structure.

Figure 2:
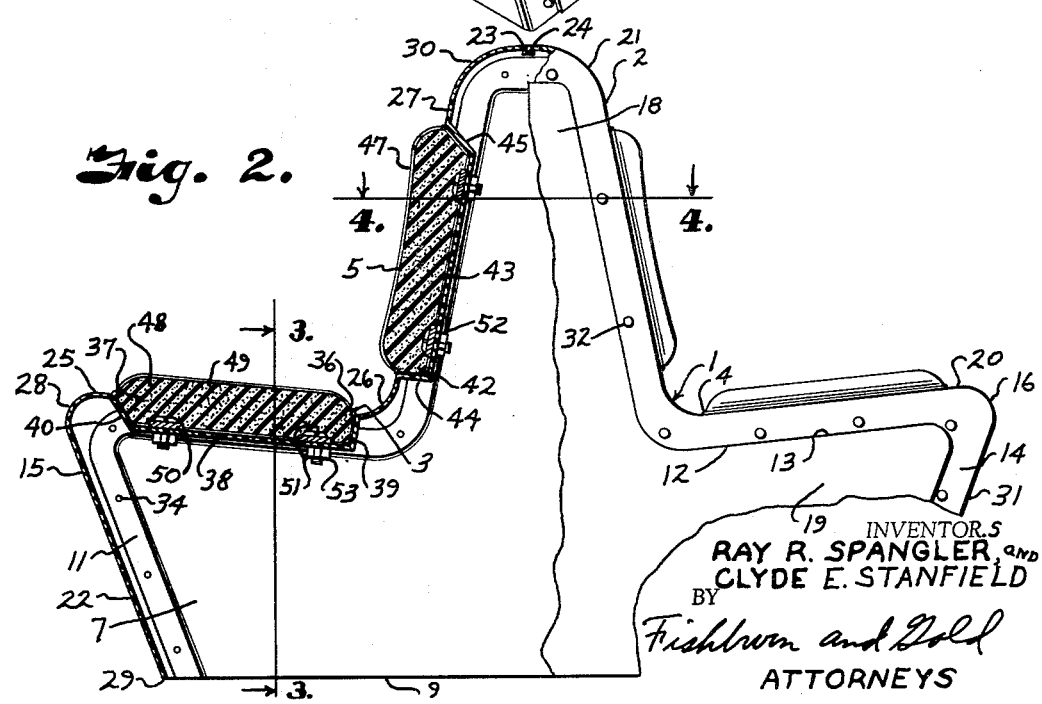
FIG. 2 is an end elevation of the booth seat structure with portions broken away to illustrate the wall and cushion arrangement of one seat and back portion.

The seat and back sections 15 and 16 each preferably include seat portions 20 and back portions 21 and a kick panel 22 all connected together and secured to the end sections whereby the upper edge 23 of the back portions of the opposed sections substantially engage with any gap therebetween being filled by a filler or trim strip 24. It is preferred that each of the seat and back sections be of one piece with a wall 25 forming the seat portion being positioned wherein it inclines upwardly at a small angle preferably in the nature of five degrees with the horizontal from a curved connecting portion 26 that connects with the bottom of a wall portion 27 of the back portion of the section. The wall 25 of the seat portion at the side remote from the back forms a rounded nose 28 that joins with the kick panel 22 that extends downwardly and inwardly at an angle of approximately 25 degrees with the vertical. The kick panel terminates in a bottom edge 29 preferably arranged to be coplanar with the bottom edge 9 of the end sections. The back portion wall 27 is rounded to the upper edge 23 as illustrated in FIG. 2 to present a curved portion 30.

The back portion wall 27, seat portion wall 25 and kick panel 22 all are connected by rounded edges 31 with the inwardly and downwardly extending flanges 14 that are preferably coextensive with the said end edges of the respective portions or panel, said flanges overlying the flanges 11 of the end sections and being suitably secured thereto whereby the seat and back sections and the end sections form a rigid structure. It is preferable that the sections 6, 7, 15 and 16 be connected in a manner that they can be separated; therefore, in the illustrated structure, the fastening devices are screws 32 that extend through aligned apertures 33 and 34 in the flanges 14 and 11 respectively.

The back portion wall 27 is preferably inclined upwardly and rearwardly from the seat portion at an angle in the nature of 15 degrees relative to the vertical whereby the inclination of the seat portion and back portions provide for comfort of persons sitting thereon. The seat portion 20 is depressed to form a recess 36 that extends from adjacent the nose 28 to the curved connecting portion 26 and from adjacent one end curved portion 31 to the other to form a large generally rectangular area for receiving a seat cushion 37. The recess 36 has a bottom wall 38 connected at one side by an upwardly extending wall 39 to the connecting portion 26 and at the other side to the wall 25 by an upwardly and forwardly inclined wall 40, and at the ends by end wall portions 41 to form the bottom and side and ends of the recess 36. The back portion 21 has a similar recess 42 which has a back wall 43 connected at its lower edge by a wall portion 44 with the curved portion 26 and at its upper portion by an inclined wall 45 and at ends by walls 46 with the back portion wall 27 to define the recess 42 and adapt same to receive a back cushion 47. The seat and back cushions may be of any resilient formation to substantially fill the recesses and have a thickness greater than the depth of the recess so as to project outwardly therefrom; however, it is preferred that they have a resilient foam rubber or plastic member 48 that is capable of being deformed under pressure and returning to its original shape when the pressure is removed. The resilient foam material 48 is preferably covered with a suitable wear-resistant upholstering material 49. Each of the cushions have mounting members 50 with fastening devices such as screws 51 that extend therefrom and through openings 52 in the walls of the respective recesses with nuts 53 or the like on the projecting portion of the screws to secure the cushions to the seat and back portions of the respective sections.

The seat structure providing opposed seats in a pair is arranged whereby there are two end sections 6 and 7, two seat and back sections 15 and 16, two seat cushions 37 and two back cushions 47, a connecting trim strip 24 and fastening devices such as screws 51. The sections and cushions are adapted to be fabricated and formed as, for example, the end sections and seat and back sections are particularly adapted for thin wall structures that may be formed of metal or the like but preferably are of fiber glass-reinforced plastic formed in molds whereby the parts are interchangeable. With the sections and cushions fabricated, they may be shipped knocked down to a point of installation and there are easily assembled to form a rigid sturdy structure. If any portion should become damaged, the respective part can be easily removed and replaced with a like part, or if a change of decor is desired different cushions may be placed in the structure.

In the form of the invention illustrated in FIG. 6, the seat structure 54 is for a single seat with the seat and back section being identical with the seat and back section 15. The end sections 55 are one-half of the end sections 6 and 7 of the structure shown in FIGS. 1 to 5 inclusive. The method of connection and erection is the same. It is believed that this booth seat structure is particularly adapted for quantity production and for forming comfortable, study seats of lightweight but rigid structure.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. A booth seat structure comprising,
  (a) a seat and back section having a seat portion, a back portion and a wall extending from a bottom edge to the seat portion to define a kick panel,
  (b) inturned flanges on ends of seat portion, back portion and said wall, said flanges terminating in inner edges,
  (c) end sections having planar wall portions with a bottom edge, said end sections having peripheral portions inset from said wall portions with an outwardly facing shoulder therebetween, said inset peripheral portions underlying said flanges,
  (d) means securing the flanges of the seat and back sections to the peripheral portions of the end sections to close ends of the structure with the inner edges of said flanges substantially engaging said shoulders,
  (e) recessed portions in the seat and back portions and occupying substantially the area thereof,
  (f) resilient seat and back cushions substantially corresponding in peripheral shape to the respective recessed portions and having a thickness greater than the depth of the recesses whereby the cushions positioned in the respective recesses extend outwardly therefrom to support persons positioned thereon,
  (g) and means removably securing the respective cushions in the respective recesses.

2. A booth seat structure as set forth in claim 1 wherein the seat and back sections and end sections are connected together only by said flanges and peripheral portions forming a hollow rigid shell adapted to rest on the bottom edges of the kick panel and end sections.

3. A booth seat structure as set forth in claim 2 wherein there are opposed seat and back sections positioned back-to-back and the end sections are single members closing the ends of the structure.

4. A booth seat structure comprising,
  (a) a seat and back section having a continuous wall extending from a bottom edge upwardly and forwardly to define a kick panel and then curved rearwardly and downwardly defining a seat portion and then upwardly and rearwardly defining a back portion terminating in an upper edge,
  (b) end flanges on said wall and extending rearwardly and downwardly therefrom with the flange at an end being in a vertical plane from the bottom of the kick panel to the top of the back portion, said end flanges terminating in inner edges,
  (c) end sections having planar wall portions with a bottom edge, said wall portion being arranged within the end flanges on the seat and back section to close the ends thereof,
  (d) inset flanges on said end sections with outwardly facing shoulders between said inset flanges and the planar wall portions, said inset flanges underlying the end flanges on the seat and back sections with said shoulders substantially engaged by the inner edges of the seat and back section flanges,
  (e) means securing the flanges of the seat and back sections to the flanges of the end sections,
  (f) recessed portions in the walls of the seat and back portions and occupying substantially the area thereof,
  (g) resilient seat and back cushion members substantially corresponding in peripheral shape to the respective recessed portions and having a thickness greater than the depth of the recesses whereby the cushions positioned in the respective recesses extend outwardly therefrom to support persons positioned thereon,
  (h) and means removably securing the respective cushions in the respective recesses.

5. A booth seat structure as set forth in claim 4 wherein the seat and back sections and end sections are connected together only at the flanges and form a hollow rigid shell adapted to rest on the bottom edges of the kick panels and end sections.

6. A booth seat structure as set forth in claim 5 wherein there are opposed seat and back sections positioned back-to-back and the end sections are single members closing the ends of the structure.

7. A booth seat structure as set forth in claim 6 wherein the seat and back sections have the kick panel, seat portion, back portion and end flanges and recessed portions all of one integral piece wherein the flanges and recessed portions together with angled relationship of the kick panel, seat portion and back portion provide rigidity in the structure.

References Cited by the Examiner

UNITED STATES PATENTS

| | | | |
|---|---|---|---|
| 1,560,922 | 11/1925 | Wege | 312—257 |
| 2,670,787 | 3/1954 | Vandas | 297—457 |
| 2,741,804 | 4/1956 | Eucker | 297—158 |
| 3,006,689 | 10/1961 | Eppink | 297—457 |
| 3,075,818 | 1/1963 | Fay | 312—257 |
| 3,110,535 | 11/1963 | Anderson | 312—257 |
| 3,171,685 | 3/1965 | Hershberger | 297—158 |
| 3,171,691 | 3/1965 | Buehrig | 297—455 |

FOREIGN PATENTS

| | | |
|---|---|---|
| 200,287 | 10/1958 | Austria. |
| 952,738 | 5/1949 | France. |
| 960,363 | 9/1960 | Great Britain. |

FRANK B. SHERRY, *Primary Examiner.*

F. K. ZUGEL, *Examiner.*